US006660807B2

(12) United States Patent
Morita et al.

(10) Patent No.: US 6,660,807 B2
(45) Date of Patent: Dec. 9, 2003

(54) ADDITIVE FOR ORGANIC RESIN AND ORGANIC RESIN COMPOSITION

(75) Inventors: Yoshitsugu Morita, Chiba Prefecture (JP); Haruhiko Furukawa, Chiba Prefecture (JP); Koji Shiromoto, Chiba Prefecture (JP); Hiroshi Ueki, Chiba Prefecture (JP)

(73) Assignee: Dow Corning Toray Silcone Co., Ltd., Tokyo (JP)

(*) Notice: Subject to any disclaimer, the term of this patent is extended or adjusted under 35 U.S.C. 154(b) by 0 days.

(21) Appl. No.: 09/999,117

(22) Filed: Oct. 31, 2001

(65) Prior Publication Data

US 2002/0151633 A1 Oct. 17, 2002

(30) Foreign Application Priority Data

Oct. 11, 2000 (JP) ........................................ 2000-342775

(51) Int. Cl.$^7$ .............................................. C08L 83/05
(52) U.S. Cl. ........................ 525/100; 525/104; 525/106; 525/539; 524/492
(58) Field of Search ................................ 524/492, 442, 524/261, 267, 266, 268, 430; 525/539, 100, 104, 106

(56) References Cited

U.S. PATENT DOCUMENTS

| | | | | | |
|---|---|---|---|---|---|
| 4,014,851 A | * | 3/1977 | Bluestein | ................. | 260/42.26 |
| 4,045,390 A | * | 8/1977 | Itoh et al. | ................. | 260/18 S |
| 4,061,609 A | * | 12/1977 | Bobear | ........................... | 260/9 |
| 4,307,023 A | | 12/1981 | Ettlinger et al. | .............. | 260/37 |
| 4,322,320 A | * | 3/1982 | Caprino | ....................... | 523/212 |
| 4,891,399 A | * | 1/1990 | Ohkawa et al. | ............. | 523/200 |
| 5,009,874 A | * | 4/1991 | Parmentier et al. | ......... | 423/335 |
| 5,106,922 A | * | 4/1992 | Saito et al. | ................. | 525/477 |
| 5,177,123 A | | 1/1993 | Takayama et al. | .......... | 523/210 |
| 5,219,922 A | * | 6/1993 | Steinberger et al. | ........ | 524/785 |
| 5,380,788 A | * | 1/1995 | Stein et al. | ................. | 524/730 |
| 5,424,374 A | * | 6/1995 | Okami | ........................ | 525/478 |
| 5,432,007 A | * | 7/1995 | Naito | ......................... | 428/447 |
| 5,508,335 A | | 4/1996 | Furukawa et al. | .......... | 524/492 |
| 5,607,992 A | * | 3/1997 | Chiba et al. | ................ | 524/190 |
| 5,665,803 A | * | 9/1997 | Nohr et al. | ................. | 524/267 |
| 5,668,225 A | * | 9/1997 | Okazaki et al. | ............. | 525/478 |
| 5,756,568 A | * | 5/1998 | Morita et al. | ................ | 524/268 |
| 6,013,715 A | * | 1/2000 | Gornowicz et al. | ......... | 524/492 |
| 6,025,435 A | * | 2/2000 | Yamakawa et al. | ......... | 524/862 |
| 6,147,160 A | * | 11/2000 | Wang et al. | ................ | 525/106 |
| 6,150,464 A | * | 11/2000 | Medsker et al. | ............ | 525/101 |
| 6,162,854 A | * | 12/2000 | Meguriya et al. | ........... | 524/437 |
| 6,281,286 B1 | * | 8/2001 | Chorvath et al. | ........... | 524/862 |
| 6,342,560 B1 | * | 1/2002 | Okel | .......................... | 524/493 |

FOREIGN PATENT DOCUMENTS

| | | | | | |
|---|---|---|---|---|---|
| JP | 56-41263 A | * | 4/1981 | ............. | C09C/1/28 |
| JP | 03-054236 | | 3/1991 | | |
| JP | 7-70442 A | * | 3/1995 | ........... | C08L/83/07 |
| JP | 9-165516 A | * | 6/1997 | ........... | C08L/83/07 |
| JP | 10-330617 | | 12/1998 | | |
| JP | 10330617 | | 12/1998 | ........... | C08L/81/02 |

OTHER PUBLICATIONS

Abstract in English JP 9–165516 A.*
Abstract in English JP 7–70442 A.*
JP 56–41263 A (Abstract in English).*

* cited by examiner

*Primary Examiner*—David W. Wu
*Assistant Examiner*—Rip A. Lee
(74) *Attorney, Agent, or Firm*—Alan Zombeck

(57) ABSTRACT

An additive for organic resin comprising a powder comprising (A) a liquid organopolysiloxane having at least 0.001 wt % of silicon-bonded hydrogen atoms and at least 50 dimethylsiloxy repeating units and (B) an inorganic powder; and an organic resin comprising the additive.

7 Claims, No Drawings

ADDITIVE FOR ORGANIC RESIN AND ORGANIC RESIN COMPOSITION

FIELD OF THE INVENTION

The present invention relates to an additive for organic resin and an organic resin composition. More specifically, the present invention relates to an additive for organic resin capable of imparting superior water repellency and surface lubricity to organic resin, and to an organic resin composition possessing superior water repellency and surface lubricity.

BACKGROUND OF THE INVENTION

It is known in the art to add liquid organopolysiloxanes to organic resins in order to impart water repellency and surface lubricity thereto and it is known to add powdery materials made up of the aforementioned organopolysiloxanes and inorganic powders (see Japanese Unexamined Patent Application Publication No. Hei 03(1991)-054236, Japanese Unexamined Patent Application Publication No. Hei 03(1991)-134050, and Japanese Unexamined Patent Application Publication No. 10(1998)-330617) in order to improve their compoundability. Although dimethylpolysiloxanes are typically used as the liquid organopolysiloxanes, they either cannot impart sufficient water repellency and surface lubricity to organic resins, or cause poor external appearance when resins are molded. In particular, liquid organopolysiloxanes with silicon-bonded hydrogen atoms have been disclosed in Japanese Unexamined Patent Application Publication No. 03(1991)-134050 and Japanese Unexamined Patent Application Publication No. 10(1998)-330617, but the above publications do not imply that the use of such liquid organopolysiloxanes can eliminate the above-mentioned problems.

It is an object of the present invention to provide an additive for organic resin capable of imparting superior water repellency and surface lubricity to organic resin and an organic resin composition possessing superior water repellency and surface lubricity.

SUMMARY OF THE INVENTION

The present invention is an additive for organic resin comprising a powder comprising (A) a liquid organopolysiloxane having at least 0.001 wt % of silicon-bonded hydrogen atoms and at least 50 dimethylsiloxy repeating units and (B) an inorganic powder; and an organic resin comprising the additive.

DESCRIPTION OF THE INVENTION

The present invention is an additive for organic resin comprising a powder comprising (A) a liquid organopolysiloxane having at least 0.001 wt % of silicon-bonded hydrogen atoms and at least 50 dimethylsiloxy repeating units and (B) an inorganic powder; and an organic resin comprising the additive.

First of all, detailed explanations are provided regarding the additive for organic resin. Component (A) is a liquid organopolysiloxane used to impart water repellency and surface lubricity to organic resin and it contains at least 0.001 wt %, preferably at least 0.005 wt %, of silicon-bonded hydrogen atoms. This is due to the fact that when the content of silicon-bonded hydrogen atoms is below the above-mentioned lower limits, the moldability of the organic resin composition may decrease. In addition, although there are no particular limitations concerning the upper limit of the content of silicon-bonded hydrogen atoms in component (A), preferably, it is not more than 1.5 wt %, more preferably, not more than 1 wt %, and, especially preferably, not more than 0.5 wt %. This is due to the fact that when the content of silicon-bonded hydrogen atoms exceeds the above-mentioned upper limits, it may not be possible to impart sufficient water repellency and surface lubricity to the organic resin composition. Component (A) is also characterized in that the number of dimethylsiloxy repeating units contained therein is at least 50, preferably at least 100, and especially preferably at least 200. This is due to the fact that when the number of dimethylsiloxy (($CH_3$)$_2$SiO) repeating units is below the above-mentioned lower limits, it may not be possible to impart sufficient water repellency and surface lubricity to the organic resin composition. Organosiloxy repeating units other than the dimethylsiloxy repeating units in component (A) are exemplified by methylphenylsiloxy (($CH_3$)$C_6H_5$SiO), diphenylsiloxy (($C_6H_5$)$_2$SiO), methylhydrogensiloxy (($CH_3$)HSiO), methylsiloxy ($CH_3$SiO), and phenylsiloxy ($C_6H_5$SiO). In addition, although there are no limitations concerning the viscosity of component (A) at 25° C., preferably, the viscosity is 40 to 100,000,000 mPa·s, more preferably 50 to 1,000,000 mPa·s, and especially preferably 100 to 1,000,000 mPa·s. This is due to the fact that if the viscosity at 25° C. is below the lower limit of the above-mentioned ranges, it may not be possible to impart sufficient water repellency and surface lubricity to the organic resin composition, and if it exceeds the upper limit of the above-mentioned ranges the compoundability of component (B) tends to decrease.

There are no particular limitations concerning the molecular structure of component (A), which can be, for example, linear, branched, linear with partial branching, cyclic, or resin-like. Component (A) is exemplified by liquid organopolysiloxanes described by general formula

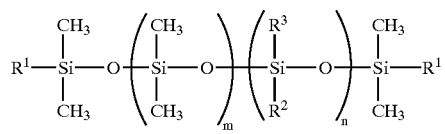

In the above formula, $R^1$ represents a monovalent hydrocarbon group or a hydrogen atom and $R^2$ represents a hydrogen atom or a monovalent hydrocarbon group exclusive of methyl, with at least one of $R^1$ and $R^2$ in the molecule representing a hydrogen atom. The monovalent hydrocarbon groups of $R^1$ are exemplified by methyl, ethyl, propyl, and other alkyl groups; phenyl, tolyl, and other aryl groups; and vinyl, allyl, and other alkenyl groups. The monovalent hydrocarbon groups represented by $R^2$ are exemplified by ethyl, propyl, and other alkyl groups; phenyl, tolyl, and other aryl groups; and vinyl, allyl, and other alkenyl groups. $R^3$ is a monovalent hydrocarbon group exemplified by the same groups as $R^1$. The subscript m in the above formula is an integer of at least 50. The subscript n in the above formula is an integer of 0 or greater, and when all $R^1$ in the formula are monovalent hydrocarbon groups, n is an integer of at least 1.

Component (A) is exemplified by the following liquid organopolysiloxanes. The subscript m in the formulas is the same as above, subscript p is at least 1, and subscript q is at least 1.

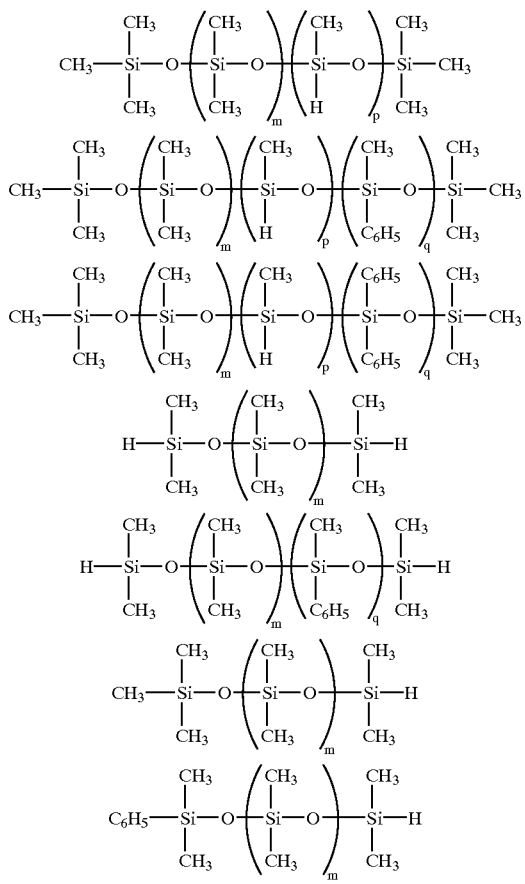

The inorganic powder of component (B) is exemplified by silica, alumina, magnesia, iron oxide, titania, zinc oxide, and other metal oxides; magnesium hydroxide, aluminum hydroxide, hydrotalcite, calcium aluminate hydrate, barium hydroxide, hard clay and other metal hydroxides; and, in addition to the above, calcium carbonate, calcium silicate, barium sulfate, talc, mica, clay, boron nitride, magnetite sand, glass beads, glass flakes, glass microballoons, diatomaceous earth, or powders consisting of metal, with metal oxide powders being especially preferable. Among such metal oxide powders, silica powder is particularly preferable. Such silica powder is exemplified by dry process silica (fumed silica) powder, wet process silica (precipitated silica) powder, fused silica powder, and crystalline silica powder. Although there are no limitations concerning the average particle size of component (B), preferably, it is not more than 100 μm, and, especially preferably, not more than 10 μm. In particular, in case of silica powder, its BET specific surface area is preferably at least 20 m$^2$/g, more preferably at least 50 m$^2$/g, and especially preferably at least 100 m$^2$/g.

Although there are no limitations concerning the content of the above-described component (B) in the additive for organic resin of the present invention, preferably its content is 50 to 250 parts by weight, more preferably 50 to 200 parts by weight, and especially preferably 75 to 150 parts by weight per 100 parts by weight of the above-described component (A). This is due to the fact that when the content of component (B) is below the lower limit of the above-mentioned ranges, it may not be possible to impart sufficient water repellency and surface lubricity to the organic resin composition, and when it exceeds the upper limit of the above-mentioned ranges it is difficult to grind it into powder for use in the additive for organic resin.

The additive for organic resin of the present invention is prepared by mixing and pulverizing component (A) and component (B). One of the methods used to mix component (A) and component (B) is, for example, a method where component (B) is subjected to agitation while component (A) is added to it. The agitator used at such time is preferably a mixer capable of high-speed shear, for example, a Henschel mixer, a Flowjet mixer, etc. The average particle size of the thus prepared additive for organic resin, which is a powder exhibiting excellent miscibility with organic resins, is preferably 0.1 to 500 μm.

Next, detailed explanations are provided regarding the organic resin composition of the present invention. The organic resin composition comprises (I) an organic resin and (II) an additive for organic resin comprising a powder comprising (A) a liquid organopolysiloxane having at least 0.001 wt % of silicon-bonded hydrogen atoms and at least 50 dimethylsiloxane repeating units and (B) an inorganic powder.

The organic resin of component (I) is exemplified by thermosetting organic resins and thermoplastic organic resins. The thermosetting organic resins are exemplified by phenolic resin, formaldehyde resin, xylene resin, xylene-formaldehyde resin, ketone-formaldehyde resin, furan resin, urea resin, imide resin, melamine resin, alkyd resin, unsaturated polyester resin, aniline resin, sulfonamide resin, silicone resin, epoxy resin, and mixtures of two or more resins mentioned above. The thermoplastic resins are exemplified by polyethylene resin, low-density polyethylene resin, high-density polyethylene resin, ultra-high molecular weight polyethylene resin, polypropylene resin, polymethylpentene resin, ethylene-(meth)acrylate copolymer resin, ethylene-vinyl acetate copolymer resin, and other polyolefin resins; polymethylmethacrylate resin, and other acrylic-based vinyl resins; polystyrene resin, high-impact polystyrene resin, acrylonitrile-butadiene-styrene copolymer resin, acrylonitrile-styrene copolymer resin, acrylonitrile-acrylic rubber-styrene copolymer resin, acrylonitrile-ethylene-propylene rubber-styrene copolymer resin, and other styrenic-based vinyl resins; polyvinyl acetate resin, polyvinyl chloride resin, polyvinylidene chloride resin, polyvinyl alcohol resin, polytetrafluoroethylene resin, and other vinyl-based resins; polybutylene terephthalate resin, polyethylene terephthalate, and other polyester resins; Nylon 6, Nylon 66, Nylon 10, Nylon 610, Nylon 11, Nylon 12, and other polyamide resins; polyacetal, and other polyoxyalkylene resins; and, in addition to the above, polycarbonate resin, modified polyphenylene ether resin, polyvinyl acetate resin, polysulfone resin, polyether sulfone resin, polyphenylene sulfide resin, polyallylate resin, polyamideimide resin, polyetherimide resin, polyether ether ketone resin, polyimide resin, liquid polyester resin, thermoplastic resin elastomers thereof, and mixtures of two or more resins mentioned above. Polyolefin resin, polyacetal resin, polyester resin, and other olefin-based and ester-based thermoplastic resin elastomers are preferable as component (I) because they impart sufficient water repellency and surface lubricity and are amenable to injection molding and extrusion molding.

The additive for organic resin of component (II), which is used for imparting sufficient water repellency and surface lubricity to the organic resin composition, is a powdery material comprising the aforementioned component (A) and the aforementioned component (B).

Although there are no particular limitations concerning the content of the aforementioned component (II) in the organic resin composition of the present invention, preferably it is 0.01 to 50 parts by weight, and especially preferably 0.1 to 50 parts by weight per 100 parts by weight of component (I). This is due to the fact that it may not be possible to impart sufficient water repellency and surface lubricity to the organic resin composition when the content of component (II) is below the lower limit of the above-mentioned ranges, and the moldability of the organic resin composition may decrease if it exceeds the upper limit of the above-mentioned ranges.

Other optional components may be combined with the organic resin composition of the present invention in order to adjust its moldability, surface lubricity, mold release properties and the like. Such optional components include calcium carbonate, mica, talc, glass fiber, carbon fiber, and other inorganic fibers; dimethylpolysiloxane having both terminal ends of the molecular chain blocked by trimethylsiloxy groups, methylphenylpolysiloxane having both terminal ends of the molecular chain blocked by trimethylsiloxy groups, diphenylpolysiloxane having both terminal ends of the molecular chain blocked by trimethylsiloxy groups, methyl(3,3,3-trifluoropropyl)polysiloxane having both terminal ends of the molecular chain blocked by trimethylsiloxy groups, organopolysiloxane resin consisting of $(CH_3)_3SiO_{1/2}$ units and $SiO_2$ units, organopolysiloxane resin consisting of $(CH_3)_3SiO_{1/2}$ units, $(CH_3)_2(CH_2=CH)SiO_{1/2}$ units, and $SiO_2$ units, organopolysiloxane resin consisting of $(CH_3)_2SiO$ units and $CH_3SiO_{3/2}$ units, organopolysiloxane resin consisting of $(CH_3)_2SiO$ units and $C_6H_5SiO_{3/2}$ units, and other organopolysiloxanes; and, in addition to the above, strength improvers, anti-oxidants, UV absorbers, photo-stabilizers, heat stabilizers, plasticizers, foaming agents, nucleating agents, lubricants, anti-static agents, electrical conductivity-imparting agents, pigments, dyes, compatibilizing agents, cross-linking agents, flame retarding agents, fungicidal agents, low profile agents, thickening agents, mold release agents, anti-clouding agents, blooming agents, and silane coupling agents.

The present organic resin composition is prepared by mixing component (I), component (II), and if necessary other components under heating. The temperature, to which the components are heated is at least the melting point of component (I). For example, when the aforementioned component (I) is an amorphous thermoplastic organic resin, the above-mentioned temperature is preferably at least 100° C. higher than the glass transition temperature of the resin and less than the decomposition temperature of the resin, and when the aforementioned component (I) is a crystalline thermoplastic organic resin, the above-mentioned temperature is preferably at least 30° C. higher than the melting point of the resin and less then the decomposition temperature of the resin. The kneading time at the above-mentioned temperature varies depending on the type of the apparatus used and operating conditions. For example when continuous kneader equipment is used, approximately 1 to 5 minutes is sufficient. Equipment permitting kneading under heating is exemplified by Banbury mixers, kneader-mixers, heated 2-roll mills, and other batch-type or single screw extruders; twin screw extruders, and other continuous mixing equipment. The use of continuous mixing equipment such as extruders is preferable, and the use of twin screw extruders is particularly preferable because of the high kneading efficiency and operating characteristics permitting a more homogeneous dispersion of component (II) in component (I).

The present organic resin composition can be molded by potting, heat transfer pressing, injection molding, extrusion, compression molding, and other methods. Because moldings obtained by injection molding possess excellent water repellency and surface lubricity, they are suitable, for example, for interior and exterior components of automobiles and for exterior components of household appliances, etc. The moldings are especially suitable for interior components of automobiles such as door trimming materials, console panels, and instrument panels. In addition, moldings obtained by extrusion molding are especially suitable for automotive components such as weather strips.

APPLICATION EXAMPLES

The additive for organic resin and the organic resin composition of the present invention are explained in detail hereinbelow by referring to application examples. The particle size of the additive for organic resin, the external appearance of moldings during the molding of the organic resin composition and the external appearance of the mold surface, as well as the water repellency and surface lubricity of the moldings, were determined in accordance with the following methods.

Determination of particle size (200-mesh pass-through %)

9 g of the additive for organic resin was passed through a sieve (200-mesh) to obtain the 200-mesh pass-through %.

External appearance of moldings during molding of organic resin composition and external appearance of mold surface:

Disk-shaped molding specimens were molded from the organic resin composition using an injection molding machine manufactured by Kabushiki Kaisha Yamashiro Seiki Seisakusho Co., Ltd. At such time, the external appearance of the moldings, and the post-molding external appearance of the mold surface were subjected to visual examination.

Water repellency of moldings

Disk-shaped molding specimens were molded from the organic resin composition using an injection molding machine manufactured by Kabushiki Kaisha Yamashiro Seiki Seisakusho Co., Ltd. A droplet of water with a diameter of 2 mm was applied to a disk-shaped molding at a temperature of 20° C. and, one minute later, the contact angle of water relative to the disk-shaped molding was determined using a contact angle meter from Kyowa Interface Science Co., Ltd.

Surface lubricity of moldings

Disk-shaped molding specimens and cylinder-shaped molding specimens were fabricated from the organic resin composition using an injection molding machine manufactured by Kabushiki Kaisha Yamashiro Seiki Seisakusho Co., Ltd. The PV limit value and coefficient of dynamic friction between the lateral surfaces of a disk-shaped molding specimen and a cylinder-shaped molding specimen were determined using a thrust-type friction and wear testing machine manufactured by Toyo Seiki Seisaku-Sho, Ltd. At such time, the frictional area was 2 cm$^2$ and the load was 2 kgf.

The liquid organopolysiloxanes used in the application examples and comparative examples are listed in Table 1. In the formulas, "Me" stands for methyl. In the table, "SiH%" stands for the content of silicon-bonded hydrogen atoms, and "viscosity" is a value measured at 25° C.

TABLE 1

| Type | Formula | SiH % (wt %) | Viscosity (mPa · s) |
|---|---|---|---|
| A1 | HMe$_2$SiO(Me$_2$SiO)$_{60}$SiMe$_2$H | 0.044 | 60 |
| A2 | Me$_3$SiO(Me$_2$SiO)$_{540}$(MeHSiO)$_{10}$SiMe$_3$ | 0.025 | 3,200 |
| A3 | HMe$_2$SiO(Me$_2$SiO)$_{1700}$SiMe$_2$H | 0.002 | 1,000,000 |
| A4 | Me$_2$SiO(MeHSiO)$_{50}$SiMe$_3$ | 1.59 | 20 |
| A5 | Me$_3$SiO(Me$_2$SiO)$_{500}$SiMe$_3$ | 0 | 2,700 |

Application Examples 1 to 3 and Comparative Examples 1 and 2.

To prepare powder additives for organic resin (D1 to D5), 1 kg of amorphous dry process silica powder (density of silanol groups on the surface=4.2 groups/100 Å$^2$, primary average particle size=20 μm, BET specific surface area=200 m$^2$/g) and 1 kg of any of the liquid organopolysiloxanes A1 to A5 were charged to a 20-L Henschel mixer and subjected to agitation at 1350 rpm for about 10 minutes. The characteristics of the additives for organic resin are listed in Table 2.

Application Example 7 and Comparative Example 6.

150 g Of an olefinic thermoplastic elastomer (Milastomer 9070N from Mitsui Chemicals, Inc.) were subjected to kneading under heating at 210° C. and 100 rpm and melted

TABLE 2

|  | Application Example 1 | Application Example 2 | Application Example 3 | Comparative Example 1 | Comparative Example 2 |
|---|---|---|---|---|---|
| Additives for organic resin | D 1 | D 2 | D 3 | D 4 | D 5 |
| Liquid organopolysiloxanes | A 1 | A 2 | A 3 | A 4 | A 5 |
| 200-mesh pass-through % (wt %) | 51 | 80 | 83 | 30 | 81 |

Application Examples 4 to 6, Comparative Example 3 to 5.

150 g Of a polypropylene resin (Noblen Y101 from Sumitomo Chemical Co., Ltd.) were subjected to kneading under heating at 210° C. and 100 rpm and melted. Subsequently, 5g of each of the additives for organic resin D1 to D5 were combined therewith and subjected to mixing under heating at 210° C. and 100 rpm for 15 minutes. After mixing, the mixture was cooled and the solidified organic resin composition was taken out. The thus obtained organic resin composition was molded using an injection molding machine and the external appearance of the moldings, as well as the post-molding external appearance of the mold surface, were subjected to visual examination. Additionally, measurement of the surface lubricity and water repellency of the moldings was carried out. The results are listed in Table 3. For comparison, organic resin was injected molded in the same manner as described above with the exception that the additives for organic resin were not combined therewith, and the external appearance of the moldings and the post-molding external appearance of the mold surface were also subjected to visual examination. Measurement of the surface lubricity and water repellency of these moldings was also carried out. The results are listed in Table 3.

in a Labo Plastomill manufactured by Toyo Seiki Seisaku-Sho, Ltd. Subsequently, 5 g of additive for organic resin D2 were combined therewith and subjected to mixing under heating at 210° C. and 100 rpm for 15 minutes. After mixing, the mixture was cooled and the solidified organic resin composition was taken out. The thus obtained organic resin composition was subjected to molding using an injection molding machine and the external appearance of the moldings, as well as the post-molding external appearance of the mold surface, were subjected to visual examination. Additionally, measurement of the surface lubricity and water repellency of the moldings was carried out. The results are listed in Table 4. For comparison, organic resin was subjected to injection molding in the same manner as described above with the exception that the additive for organic resin, D2, was not combined therewith, and the external appearance of the moldings and the post-molding external appearance of the mold surface were also subjected to visual examination. Measurement of the surface lubricity and water repellency of the moldings was also carried out. The results are listed in Table 4.

TABLE 3

|  | Application Example 4 | Application Example 5 | Application Example 6 | Comparative Example 3 | Comparative Example 4 | Comparative Example 5 |
|---|---|---|---|---|---|---|
| Additives for organic resin | D 1 | D 2 | D 3 | D 4 | D 5 | None |
| Water contact angle (°) | 106 | 106 | 104 | 99 | 103 | 96 |
| Coefficient of dynamic friction | 0.21 | 0.15 | 0.09 | 1.35 | 0.45 | 1.43 |
| PV limit value (kgf/cm$^2$ · cm/sec) | 400 | 400 | 400 | 400 | 390 | 400 |
| External appearance of moldings | Excellent | Excellent | Rather good (slight bleeding) | No good (bleeding) | No good (bleeding) | Excellent |
| External appearance of mold surface | Excellent | Excellent | Excellent | No good | No good | Excellent |

TABLE 4

|  | Application Example 7 | Comparative Example 6 |
|---|---|---|
| Additives for organic resin | D2 | None |
| Water contact angle (°) | 104 | 94 |
| Coefficient of dynamic friction | 0.09 | 1.75 |
| PV limit value (kgf/cm$^2$ · cm/sec) | 370 | 430 |
| External appearance of moldings | Excellent | Excellent |
| External appearance of mold surface | Excellent | Excellent |

We claim:

1. An organic resin composition comprising; (I) a thermoplastic organic resin selected from the group consisting of polyolefin, polyester, polystyrene, polyacrylic, and polyvinylchloride resins and (II) an additive for organic resin consisting essentially of 100 parts by weight of (A) a liquid organopolysiloxane having at least 0.001 wt % of silicon-bonded hydrogen atoms and at least 50 dimethylsiloxy repeating units and 50 to 250 parts by weight of a (B) metal oxide, wherein said additive is a powder having an average particle size of 0.1 to 500 μm.

2. The organic resin composition according to claim 1, where component (A) has a viscosity at 25° C. of 40 to 100,000,000 mPa·s.

3. The organic resin composition according to claim 1, where the content of component (II) is 0.1 to 50 parts by weight per 100 parts by weight of component (I).

4. The organic resin composition according to claim 1, where component (A) comprises 0.005 to 0.5 wt % silicon-bonded hydrogen atoms.

5. The organic resin composition according to claim 1, where component (A) has a viscosity at 25° C. of 100 to 1,000,000 mPa·s.

6. The organic resin composition according to claim 1, where component (B) is silica powder having a BET specific surface area of at least 100 m$^2$/g.

7. The organic resin composition according to claim 1 comprising 75 to 150 parts by weight of component (B) per 100 parts by weight of component (A).

* * * * *